United States Patent [19]

Levin

[11] Patent Number: 5,570,764
[45] Date of Patent: Nov. 5, 1996

[54] ROLLER WHEEL ASSEMBLY

[75] Inventor: Norman Levin, Mercer Island, Wash.

[73] Assignee: Roller Wheels, Inc., Seattle, Wash.

[21] Appl. No.: 381,749

[22] Filed: Feb. 1, 1995

[51] Int. Cl.$^6$ .............................. A45C 5/14; A47B 91/00; B60B 15/00

[52] U.S. Cl. ............................ 190/18 A; 16/18 R; 16/45; 301/41.1

[58] Field of Search .................... 190/18 A; 16/18 R, 16/45, 47; 301/41.1, 43

[56] References Cited

U.S. PATENT DOCUMENTS

| | | | |
|---|---|---|---|
| D. 292,873 | 11/1987 | Chen | D8/375 |
| 935,104 | 9/1909 | Hakanson | 301/43 |
| 981,398 | 1/1911 | Durbin . | |
| 998,512 | 7/1911 | Heron | 16/45 X |
| 1,779,994 | 10/1930 | Tatter . | |
| 2,554,392 | 5/1951 | Turner | 301/40 |
| 2,590,154 | 3/1952 | Burns | 280/47.31 X |
| 2,602,676 | 7/1952 | Fieldhouse | 280/47.31 X |
| 2,655,361 | 10/1953 | Soehl et al. | 180/20 X |
| 2,967,058 | 1/1961 | Hoffmann, Jr. | 280/30 |
| 3,096,992 | 7/1963 | Fritsch | 280/47.31 X |
| 3,140,506 | 7/1964 | Arenson | 16/47 |
| 3,363,713 | 1/1968 | Blonsky | 180/93 |
| 3,418,960 | 12/1968 | Nelson | 115/1 |
| 3,623,406 | 11/1971 | Leben | 301/41.1 X |
| 3,677,571 | 7/1972 | Maturo, Jr. et al. | 280/47.3 X |
| 3,809,231 | 5/1974 | Palma et al. | 190/18 AX |
| 3,899,801 | 8/1975 | Carrier | 16/45 |
| 3,981,042 | 9/1976 | Carrier | 16/47 |
| 4,012,051 | 3/1977 | Embinder | 280/47.19 |
| 4,090,570 | 5/1978 | Alexander | 301/43 |
| 4,772,035 | 9/1988 | Danial | 280/47.3 |
| 5,265,894 | 11/1993 | Dunn | 150/159 |

FOREIGN PATENT DOCUMENTS

| | | | |
|---|---|---|---|
| 1292341 | 3/1962 | France | 190/18 A |
| 1539021 | 1/1979 | United Kingdom | 190/18 A |

*Primary Examiner*—Sue A. Weaver
*Attorney, Agent, or Firm*—Christensen O'Connor Johnson & Kindness, PLLC

[57] ABSTRACT

A roller wheel assembly for use with golf bag covers or other types of luggage is disclosed. The roller wheel assembly (10) includes a housing (12) and a wheel (14). The housing (10) has an exterior surface (34) and an elongate recessed channel (36). The wheel (14) is elongate and rotatably mounted in the channel (36) of the housing (10) so as to partially protrude beyond the surface (34) of the housing. The wheel (14) includes two circular end plates (42), each having an inner surface (44) and an outer surface (46). A rigid transverse webbing (50) extends radially between the inner surfaces of the end plates, maintaining a planar relationship between the end plates. The webbing includes longitudinal dividers (52) that lie perpendicular to the inner surface of the end plates and run the length of the wheel. The width of the dividers equals the diameter of the end plates, the dividers intersect at the center point of each end plate, and the longitudinal dividers divide the space between the two end plates into a plurality of sections (54). The webbing also includes a plurality of sectors (56), angled with respect to the end plates and located between the longitudinal dividers (52).

22 Claims, 5 Drawing Sheets

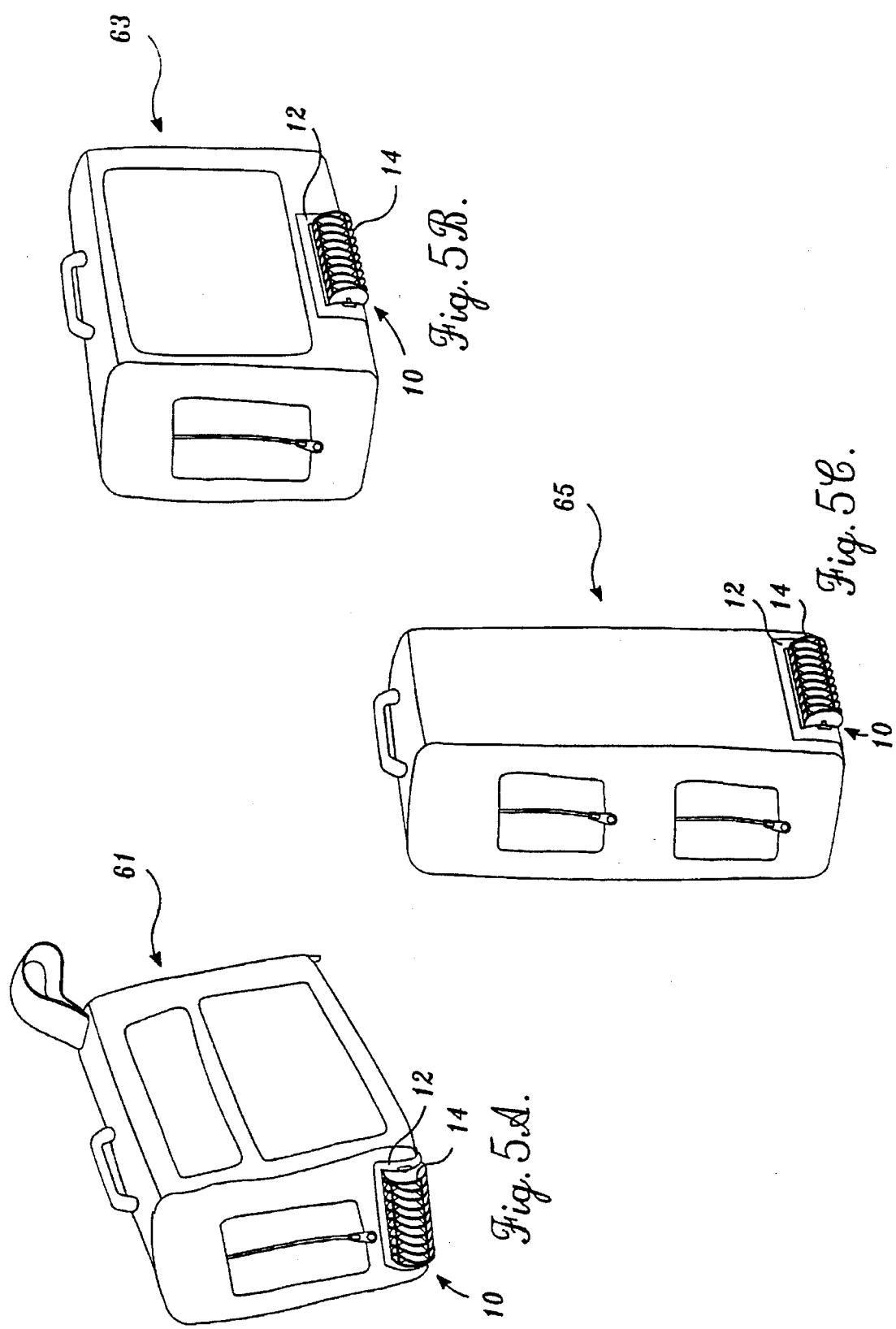

ROLLER WHEEL ASSEMBLY

FIELD OF THE INVENTION

The present invention generally relates to roller wheel assemblies and, more specifically, to roller wheel assemblies for use with golf bag covers and other types of luggage.

BACKGROUND OF THE INVENTION

A wide variety of wheel assemblies have been developed for various containers such as golf bags, carriers, or, more generally, luggage, to facilitate more easily their transportation. Modem wheel assemblies typically comprise two or more wheels mounted in a rigid housing located along the bottom or base of a golf bag cover or other type of luggage. Typically, the housing and wheels have been formed of plastic or metal and either fixed to the base of the luggage, or located within a recess formed in the base.

The surfaces over which golf bag covers and other types of luggage are typically moved are often rough or uneven or "hostile" in other ways. Modem wheel assemblies often fail to provide smooth, easy, and convenient movement over such surfaces. Small, multiple-wheel assemblies along the base of a golf bag cover or other type of luggage often render the container unbalanced, resulting in tipping and shifting of contents as the wheels strike imperfections in the surface. In addition to their inherent instability, the small wheels used in modem wheel assemblies are prone to falling into cracks or holes, and getting lodged between uneven surfaces, causing additional hardship for a person pulling or pushing a golf bag cover or other type of luggage. Finally, multiple-wheel assemblies are usually more expensive to manufacture than single-wheel assemblies.

Beyond the difficulty and expense associated with the multiple wheels used in modem wheel assemblies for luggage and other transport containers, the construction of traditional wheels creates further problems. How the wheel is made and what it is made of have a significant impact on the functionality of the wheel assembly. Factors such as bulk and weight, for example, are necessary considerations in the design of luggage wheel assemblies. Traditionally, the tradeoff between a solid wheel and a hollow wheel has been weight for strength. While a solid wheel provides structural integrity and strengthens the overall wheel, it also adds weight to the container. Wheels having hollow interiors, on the other hand, reduce the weight of the wheel assembly, but are more prone to developing cracks or other flaws resulting in damage to the entire wheel assembly. Finally, cost is an additional consideration factoring into the design and manufacture of wheel assemblies used for luggage. Solid or heavily fortified wheels tend to be stronger and last longer, but are also more costly to manufacture. Hollow wheels, while perhaps being less expensive to make, demonstrate the other disadvantages noted above.

The design of wheel surfaces also affects the movement of a container over a given surface, as well as the wheel's overall structural strength and durability. An inflexible wheel surface may lend the wheel greater strength, but will also result in providing little or no traction when the wheel is used over uneven and possibly slick surfaces. A porous wheel surface, such as found with grate- or grill-type surfaces used on wheels attached to beach carts, provides better traction, but sacrifices structural strength and possibly overall wheel assembly durability when used on hard surfaces. Furthermore, such grill-type surfaces have little application outside of beach areas where sand is the predominant terrain, and their expense to manufacture decreases their desirability for use with other types of containers.

Thus, there is need, particularly in implementations involving golf bag covers or other types of luggage or containers, for a balanced, lightweight, structurally strong, and low-cost wheel assembly that improves the ease and efficiency of transport of such containers over a variety of surfaces. The present invention is directed to fulfilling some of this need.

SUMMARY OF THE INVENTION

In accordance with the present invention, a roller wheel assembly for use with golf bags or luggage is provided. More specifically, a roller wheel assembly is provided having a housing and at least one wheel. The housing has an exterior surface and an elongate recessed channel. The wheel is elongate and rotatably mounted in the channel of the housing so as to protrude at least partially beyond the exterior surface of the housing. The wheel further includes two circular end plates, each having an inner surface and an outer surface, and a rigid transverse webbing. The rigid transverse webbing is integral with and extends between the inner surfaces of the end plates. The periphery of the transverse webbing corresponds to the periphery defined by the circular edge of the circular end plates.

In accordance with further aspects of this invention, the wheel of the roller wheel assembly further includes two cylindrical pins, each pin integral with and extending outwardly from the outer surface of the end plates. Further, the roller wheel assembly includes notches located at the ends of the channel for receiving the pins and tabs affixed to the housing for maintaining the pins in the notches.

In accordance with still other aspects of this invention, the rigid traverse webbing includes a plurality of longitudinal dividers that He perpendicular to the inner surfaces of the end plates and span the distance therebetween. Preferably, the longitudinal dividers intersect at the center point of each end plate and divide the space between the two end plates into a plurality of sections.

In accordance with still other aspects of this invention, the rigid transverse webbing includes a plurality of sectors, integral with the longitudinal dividers and angled with respect to the end plates. The outer periphery of the sectors follows the circular contour of the circular end plates.

As will be appreciated from the foregoing summary, the invention provides a roller wheel assembly suitable for integration with a golf bag cover or other type of luggage that uses a unique rigid transverse webbing between two circular end plates to form the riding surface of an elongate cylindrically shaped wheel. Having a single elongate wheel provides advantages of stability and balance over multiple wheels separated along the base of a golf bag cover or other type of luggage. The webbed surface with its included sectors has reduced bulk and weight when compared to wheels with a solid surface. The rigid transverse webbing and integrated angled sectors provide structural strength adequate to support and move relatively large loads over a variety of surfaces without being destroyed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 5A is a perspective view showing a roller wheel assembly formed in accordance with the present invention and incorporated in a garment bag;

FIG. 5B is a perspective view of a roller wheel assembly formed in accordance with the present invention and incorporated in a suitcase; and FIG. 5C is a perspective view of a roller wheel assembly formed in accordance with the present invention and incorporated in a carryon bag.

DETAILED DESCRIPTION OF THE PREFERRED EMBODIMENT

Figure 1:
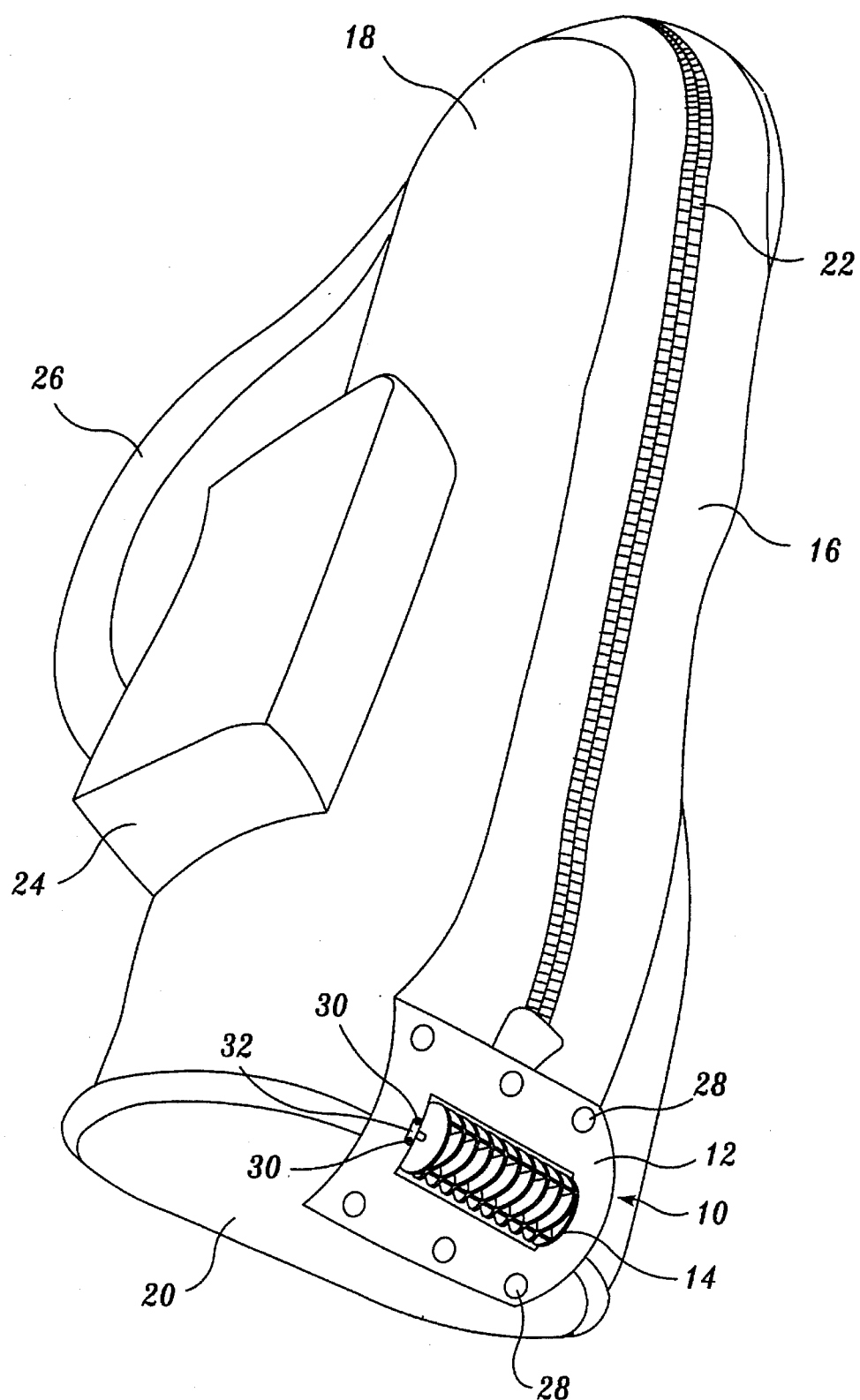
FIG. 1 is a perspective view of one embodiment of a roller wheel assembly formed in accordance with the present invention incorporated in a golf bag cover.

A roller wheel assembly 10 for use with golf bag covers or other types of luggage made in accordance with the present invention is illustrated by FIGS. 1–5. More specifically, FIG. 1 illustrates a roller wheel assembly 10 formed in accordance with the present invention mounted in a golf bag cover 16 that comprises a flexible cover 18, a base 20, a fastener 22, such as a zipper, for closing the cover, an external pocket 24, and a strap 26, such as a shoulder or carrying strap, to facilitate carrying, pulling, or otherwise transporting the golf bag and its contents. The roller wheel assembly 10 includes a wheel assembly housing 12 and a single elongate wheel 14. The housing 12 of the roller wheel assembly 10 is affixed to the golf bag cover 16 at or near the base 20 by fasteners 28, such as rivets. The wheel 14, in turn, is rotatably mounted in the housing 12.

Figure 2:
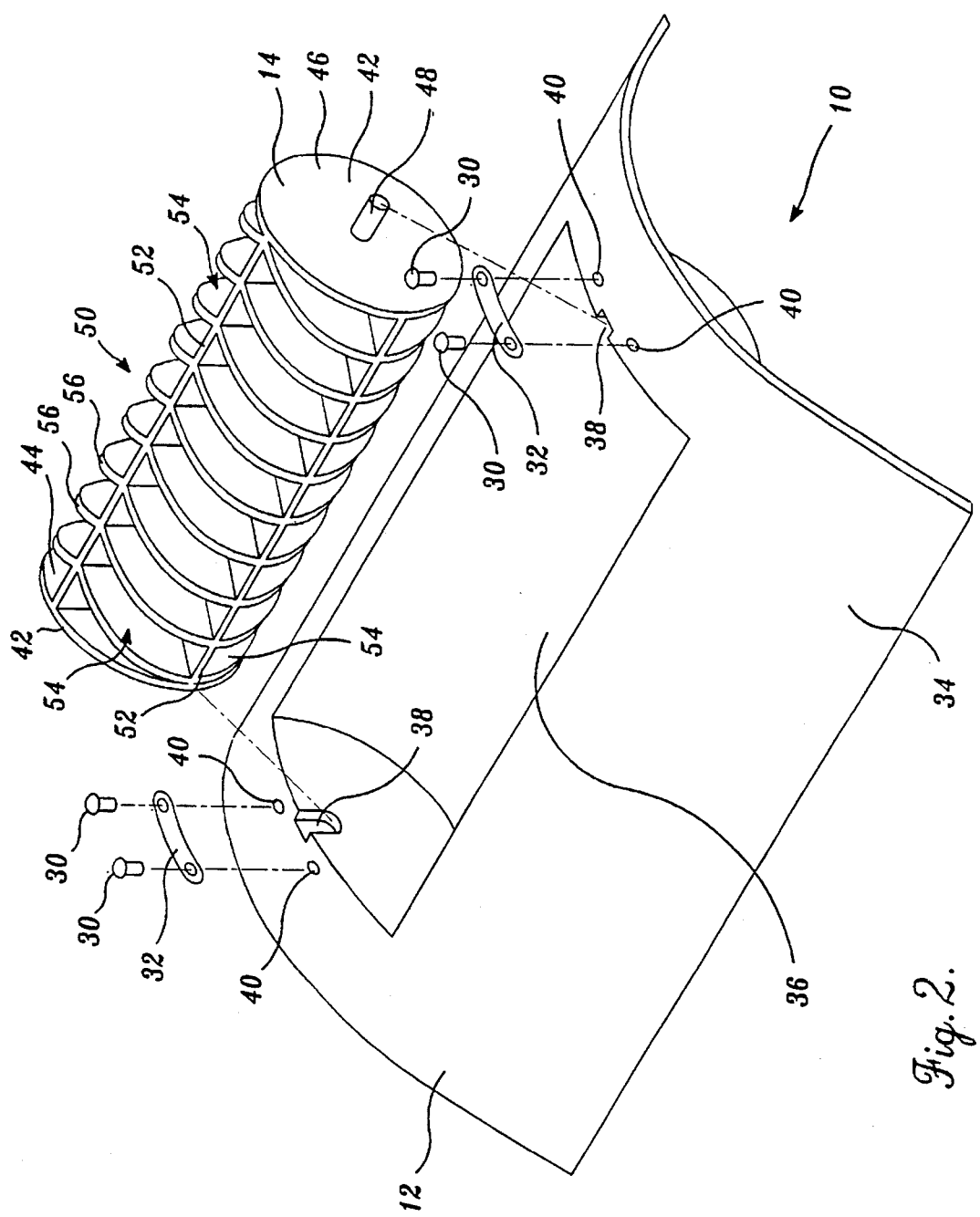
FIG. 2 is an exploded perspective view of the roller wheel assembly shown in FIG. 1.
Figure 3:
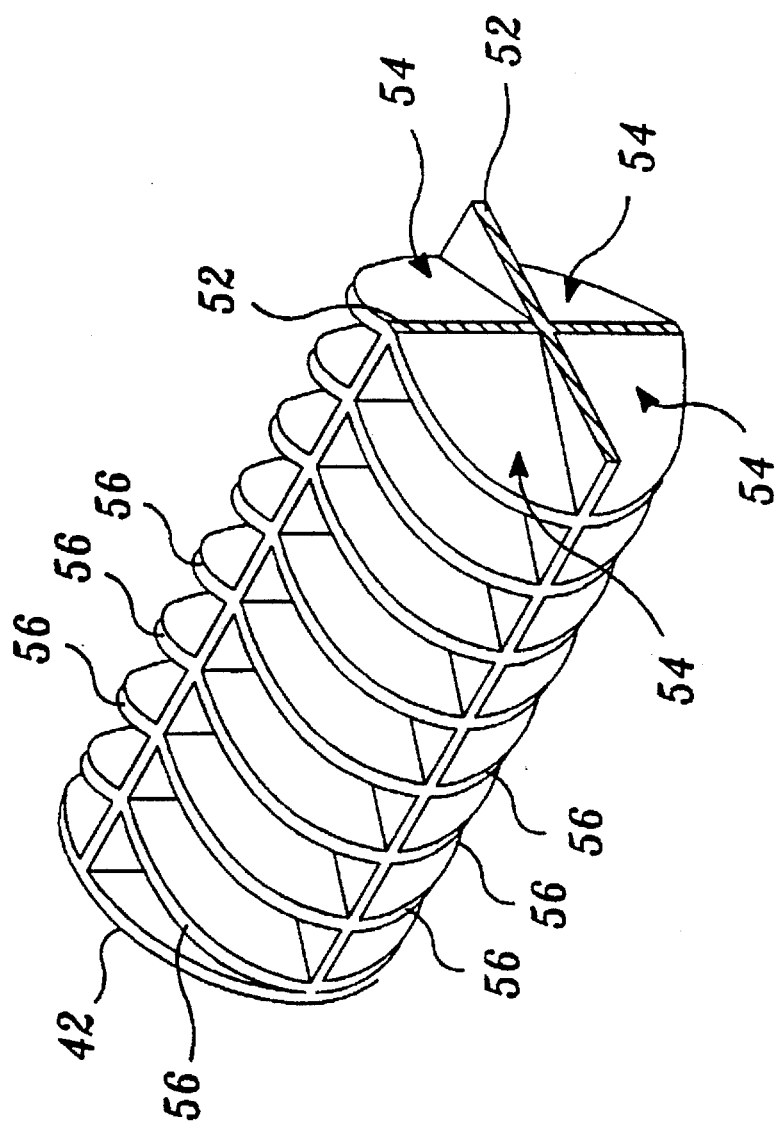
FIG. 3 is a cutaway perspective view of a wheel of the roller wheel assembly shown in FIG. 1.
Figure 4:
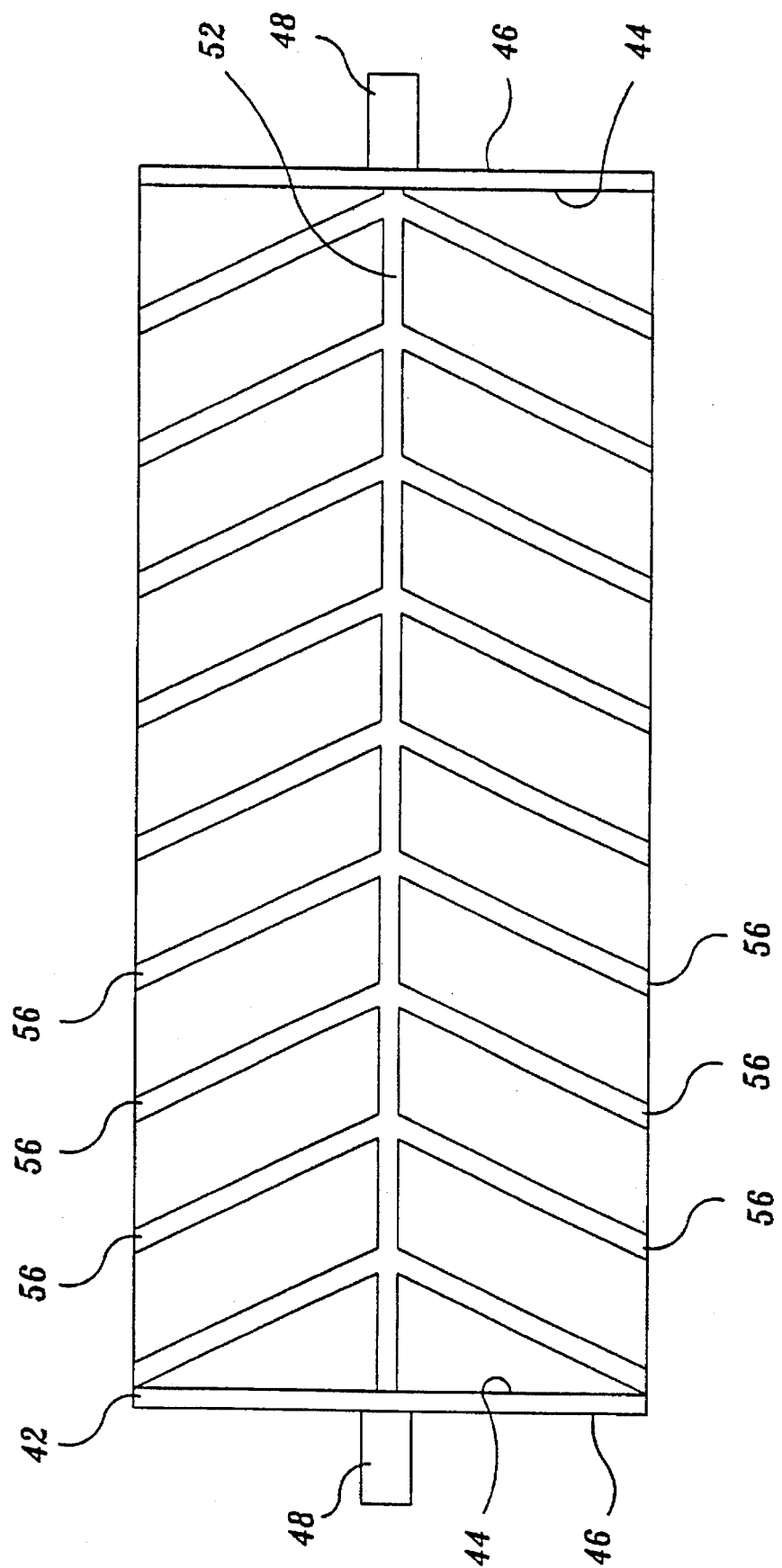
FIG. 4 is a plan view of the wheel of the roller wheel assembly shown in FIG. 1.

As more clearly shown in FIG. 2, the wheel assembly housing 12 has an outer surface 34 that is slightly bowed in the middle such that its cross-sectional width has a semicircular appearance. Protruding inward from the surface 34 of the housing 12 is an elongate recess that forms a semicircular channel 36 that runs nearly the length of the housing. Located at either longitudinal end of the channel 36 is a notch 38 having a semicircular bottom that protrudes inwardly from the surface 34. Two holes 40 are formed in the surface 34, one being located on each side of each notch 38. The holes 40 are sized to receive fasteners 30, such as rivets, that attach straps 32 to the housing so as to close the ends of the slots 38 that intersect the surface 34. Preferably, the wheel assembly housing 12 is molded from a suitably rigid plastic material.

The rigid, elongate wheel 14 includes two circular end plates 42, each having an inner surface 44 and an outer surface 46. A cylindrical pin 48 extends outward from the center of the outer surface of each end plate. Preferably, the pins 48 are integrally formed with their respective end plates. The pins 48 are sized to fit within the notches 38 that extend inwardly from the surface 34 of the housing 12, such that the pins 48 fit loosely but securely into the notches 38. The pins are held in the notches by the straps 32 that enclose the open ends of the notches 38.

The wheel 14 also includes a rigid transverse webbing 50 that extends between the inner surfaces 44 of the end plates 42. Preferably, the webbing is integral with the end plates 42. Also, preferably, the webbing 50, along with the other elements of the wheel 14, is formed from a suitably rigid plastic material. Most preferably, at least the periphery of the wheel is "plasticized" to soften the wheel's peripheral surface.

The webbing 50 includes two longitudinal dividers 52, generally rectangular in shape, and having a width or latitudinal length equal to the diameter of the circular end plates 42. The dividers lie perpendicular to and extend between the inner surfaces 44 of the end plates 42, effectively connecting the end plates to form the wheel 14. The dividers 52 are formed so as to perpendicularly intersect each other at their longitudinal centers, thereby creating a single+-shaped divider that defines four equally sized quadrants, or sections 54. As more clearly understood by reference to FIG. 3, in conjunction with FIG. 2, each of the sections 54 extends the length of the dividers 52. The rigid structure of the dividers 52 maintains the end plates in a perpendicular, planar relationship with respect to each other. Preferably, the dividers 52 are integrally formed with one another and with the end plates 42.

The webbing 50 further includes sectors 56 located on the sections 54, i.e., between the longitudinal dividers 52 and between the end plates 42. As better understood by reference to FIGS. 2–4, the sectors 56 are rigid, pie-shaped wedges whose radial edges conform to and are integral with the surfaces of the dividers 52. Further, the outer periphery of the sectors is curved to follow the contour of the circular end plates. The sectors 56 do not perpendicularly intersect the dividers 52. Rather, the sectors 56 obliquely intersect the dividers 52. Thus, the sectors extend from the longitudinal edge of each divider 52 at a nonperpendicular angle with respect to the end plates 42. While nonperpendicular with respect to the dividers, the sectors 56 lying within each section 54 lie generally parallel to each other. The sectors 56 run the length of the wheel 14, spaced to create a series of ribs along the length of the wheel.

As noted above, preferably, the pins 48, end plates 42, longitudinal dividers 52, and sectors 56 are integral with one another. Preferably, these elements are molded together from a suitably rigid plastic. As also noted above, preferably at least the outer surfaces of these elements are plasticized to soften the outer periphery of the wheel to make it quieter when rolling over a hard surface.

Although the preferred embodiment described above specifies two dividers and a plurality of wedge-shaped sectors formed within four sections, it should be readily apparent that the number of dividers, and therefore sections, as well as the number of sectors, can be changed to create a comparable webbing for the wheel without departing from the spirit and scope of the invention. Three longitudinal dividers, for instance, could be formed to intersect at their center points, radially extending to meet the edges of the end plates, so as to create six longitudinal spaces or sections wherein sectors of a less than quadrant size are placed to form the ribs making up the webbing of the wheel. A unique feature of the present invention is its use of this webbing to provide structural strength to the wheel, while not unduly increasing the overall weight or bulk of the roller wheel assembly.

In addition to the use of the roller wheel assembly in conjunction with a golf bag cover, it will also be appreciated that roller wheel assemblies formed in accordance with the present invention can also be used on other types of luggage and other types of products. FIG. 5A, for example, illustrates a roller wheel assembly formed in accordance with this invention incorporated in a garment bag 61. FIG. 5B shows a roller wheel assembly formed in accordance with this invention incorporated in a suitcase or large briefcase 63. Finally, FIG. 5C shows a roller wheel assembly formed in accordance with the present invention incorporated in a piece of carryon luggage 65.

While the preferred embodiment of the invention has been illustrated and described, it will be appreciated that, within the scope of the appended claims, various changes can be made therein without departing from the spirit of the invention.

The embodiments of the invention in which an exclusive property or privilege is claimed are defined as follows:

1. A piece of luggage, comprising:
   (a) a bag having a base and sides joined to form a container;
   (b) a handle attached to said bag;
   (c) a rigid portion along the base of said bag;
   (d) a housing having an outer surface and an elongate recessed channel extending inwardly from the outer surface, affixed to said rigid portion;
   (e) an elongate wheel, said wheel including:
      (i) two circular end plates, each having an inner and an outer surface; and
      (ii) a transverse rigid webbing unitarily formed with and extending between the inner surfaces of said end plates; and
   (f) a mounting mechanism for rotatably mounting said elongate wheel in the channel of said housing such that said elongate wheel protrudes at least partially beyond the surface of said housing.

2. The luggage claimed in claim 1, wherein the mounting mechanism includes:
   (a) slots located at either end of the recessed channel and
   (b) two cylindrical pins, one pin extending outwardly from the outer surface of each of said end plates of said elongate wheel, the pins mounted in the slots in the recessed channel.

3. The luggage claimed in claim 1, wherein said rigid transverse webbing includes longitudinal dividers that lie perpendicular to the inner surface of said end plates and run the length said wheel.

4. The luggage claimed in claim 3, wherein the mounting mechanism includes:
   (a) slots located at either end of the recessed channel; and
   (b) two cylindrical pins, one pin extending outwardly from the outer surface of each of said end plates of said elongate wheel, the pins mounted in the slots in the recessed channel.

5. The luggage of claim 3, wherein said webbing also includes a plurality of sectors located between the longitudinal dividers and angled with respect to said end plates, the outer periphery of the sectors following the circular contour of said end plates.

6. The luggage assembly of claim 3, wherein the width of the longitudinal dividers equals the diameter of the circular end plates, the longitudinal dividers intersect the center point of each end plate, and the longitudinal dividers divide the space between the two end plates into a plurality of sections.

7. The luggage claimed in claim 6, wherein the mounting mechanism includes:
   (a) slots located at either end of the recessed channel; and
   (b) two cylindrical pins, one pin extending outwardly from the outer surface of each of said end plates of said elongate wheel, the pins mounted in the slots in the recessed channel.

8. The luggage of claim 6, wherein said webbing also includes a plurality of sectors, located in the sections between the longitudinal dividers and angled with respect to said end plates, the outer periphery of the sectors following the circular contour of said end plates.

9. The luggage claimed in claim 8, wherein the mounting mechanism includes:
   (a) slots located at either end of the recessed channel; and
   (b) two cylindrical pins, one pin extending outwardly from the outer surface of each of said end plates of said elongate wheel, the pins mounted in the slots in the recessed channel.

10. A roller wheel assembly, comprising:
    (a) a housing having an outer surface and an elongate recessed channel extending inwardly from this outer surface;
    (b) an elongate wheel, said wheel including:
       (i) two circular end plates, each having an inner and an outer surface; and
       (ii) a rigid transverse webbing unitarily formed with and extending between the inner surfaces of said end plates; and
    (c) a mounting mechanism for rotatably mounting said elongate wheel in the channel of said housing such that said elongate wheel protrudes at least partially beyond the surface of said housing.

11. The roller wheel assembly of claim 10, wherein the mounting mechanism includes:
    (a) slots located at either end of the recessed channel; and
    (b) two cylindrical pins, one pin extending outwardly from the outer surface of each of said end plates of said elongate wheel, the pins mounted in the slots in the recessed channel.

12. The roller wheel assembly of claim 10, wherein said rigid transverse webbing includes longitudinal dividers that lie perpendicular to the inner surface of said end plates and run the length said wheel.

13. The roller wheel assembly of claim 12, wherein the mounting mechanism includes:
    (a) slots located at either end of the recessed channel; and
    (b) two cylindrical pins, one pin extending outwardly from the outer surface of each of said end plates of said elongate wheel, the pins mounted in the slots in the recessed channel.

14. The roller wheel assembly of claim 12, wherein the width of the longitudinal dividers equals the diameter of the circular end plates, the longitudinal dividers intersect at the center point of each end plate, and the longitudinal dividers divide the space between the two end plates into a plurality of sections.

15. The roller wheel assembly of claim 14, wherein the mounting mechanism includes:
    (a) slots located at either end of the recessed channel; and
    (b) two cylindrical pins, one pin extending outwardly from the outer surface of each of said end plates of said elongate wheel, the pins mounted in the slots in the recessed channel.

16. The roller wheel assembly of claim 14, wherein said webbing also includes a plurality of sectors, located in the sections between the longitudinal dividers and angled with respect to said end plates, the outer periphery of the sectors following the circular contour of said end plates.

17. The roller wheel assembly of claim 16, wherein the mounting mechanism includes:

(a) slots located at either end of the recessed channel; and (b) two cylindrical pins, one pin extending outwardly from the outer surface of each of said end plates of said elongate wheel, the pins mounted in the slots in the recessed channel.

18. The roller wheel assembly of claim 12, wherein said webbing includes a plurality of sectors, located between the longitudinal dividers and angled with respect to said end plates, the outer periphery of the sectors following the circular contour of said end plates.

19. The roller wheel assembly of claim 18, wherein the mounting mechanism includes:

(a) slots located at either end of the recessed channel; and (b) two cylindrical pins, one pin extending outwardly from the outer surface of each of said end plates of said elongate wheel, the pins mounted in the slots in the recessed channel.

20. A wheel for a roller wheel assembly, comprising an elongate wheel having two circular end plates, each end plate having an inner and an outer surface, and a rigid transverse webbing unitarily formed with and extending between the inner surfaces of said end plates, said rigid transverse webbing including longitudinal dividers that lie perpendicular to the inner surface of said end plates and run the length of said wheel, wherein:

(a) the width of the longitudinal dividers equals the diameter of the circular end plates;

(b) the longitudinal dividers intersect at the center point of each end plate; and (c) the longitudinal dividers divide the space between the two end plates into a plurality of sections.

21. The wheel of claim 20, wherein said webbing also includes a plurality of sectors, located between the longitudinal dividers and angled with respect to said end plates, the outer periphery of the sectors following the circular contour of said end plates.

22. A wheel for a roller wheel assembly, comprising an elongate wheel having two circular end plates, each end plate having an inner and an outer surface, and a rigid transverse webbing unitarily formed with and extending between the inner surfaces of said end plates, said rigid transverse webbing including longitudinal dividers that lie perpendicular to the inner surface of said end plates and run the length of said wheel, wherein said webbing also includes a plurality of sectors, located between the longitudinal dividers and angled with respect to said end plates, the outer periphery of the sectors following the circular contour of said end plates.

* * * * *

UNITED STATES PATENT AND TRADEMARK OFFICE
CERTIFICATE OF CORRECTION

PATENT NO. : 5,570,764
DATED : November 5, 1996
INVENTOR(S) : N. Levin

It is certified that error appears in the above-indentified patent and that said Letters Patent is hereby corrected as shown below:

<u>COLUMN</u>     <u>LINE</u>

Item: [57]      Abstract      "mourned" should read --mounted--

5              35           After channel" insert --;--
(Claim 2,   line 3)

5              43           After "length" insert --of--
(Claim 3,   line 4)

6              39           After "length" insert --of--
(Claim 12,  line 4)

Signed and Sealed this

Twenty-second Day of April, 1997

Attest:

BRUCE LEHMAN

*Commissioner of Patents and Trademarks*

*Attesting Officer*